US007925732B2

(12) United States Patent
Shively, II et al.

(10) Patent No.: US 7,925,732 B2
(45) Date of Patent: Apr. 12, 2011

(54) AUTOMATIC HARDWARE FAILURE DETECTION AND RECOVERY FOR DISTRIBUTED MAX SESSIONS SERVER

(75) Inventors: Darrell Myers Shively, II, El Toro, CA (US); John Knight, Lake Forest, CA (US); Kavita Shekhar Patil, Foothill Ranch, CA (US); Pauline Chen Boyd, Irvine, CA (US); Sonny Bui, Huntington Beach, CA (US); Thomas Anthony Roden, Irvine, CA (US)

(73) Assignee: Cisco Technology, Inc., San Jose, CA (US)

( * ) Notice: Subject to any disclaimer, the term of this patent is extended or adjusted under 35 U.S.C. 154(b) by 638 days.

(21) Appl. No.: 11/900,257

(22) Filed: Sep. 11, 2007

(65) Prior Publication Data
US 2008/0005328 A1 Jan. 3, 2008

Related U.S. Application Data

(62) Division of application No. 09/410,511, filed on Sep. 30, 1999, now Pat. No. 7,272,649.

(51) Int. Cl.
*G06F 15/173* (2006.01)
*G06F 15/16* (2006.01)

(52) U.S. Cl. .............................. 709/223; 709/219; 726/3
(58) Field of Classification Search .................. 709/219, 709/223; 726/3
See application file for complete search history.

(56) References Cited

U.S. PATENT DOCUMENTS

| | | | |
|---|---|---|---|
| 4,694,487 A | 9/1987 | Chang et al. | |
| 5,276,801 A | 1/1994 | Heyen et al. | |
| 5,283,783 A | 2/1994 | Nguyen et al. | |
| 5,287,103 A | 2/1994 | Kasprzyk et al. | |
| 5,361,250 A | 11/1994 | Nguyen et al. | |
| 5,542,047 A | 7/1996 | Armstrong | |
| 5,555,244 A | 9/1996 | Gupta et al. | |
| 5,581,478 A | 12/1996 | Cruse et al. | |
| 5,592,538 A | 1/1997 | Kosowsky et al. | |
| 5,610,910 A | 3/1997 | Focsaneanu et al. | |
| 5,671,354 A | 9/1997 | Ito et al. | |
| 5,673,265 A | 9/1997 | Gupta et al. | |

(Continued)

FOREIGN PATENT DOCUMENTS
EP 0 888 029 12/1998
(Continued)

OTHER PUBLICATIONS

"Active Software's Integration System", Active Software, Inc., printed from http://www.activesw.com/products/products.html, on Jul. 24, 1998.

(Continued)

*Primary Examiner* — Douglas B Blair
(74) *Attorney, Agent, or Firm* — Patent Capital Group

(57) ABSTRACT

A Max Sessions Server (MSS) automatically detects hardware and communications failures. Upon detection, counters are adjusted accordingly to maintain an accurate count of users or groups of users on a system. A database of unique identifiers for each connection is maintained, where the unique identifier is a concatenation of a Network Access Server (NAS) and the connection's incoming NAS node number. If a user requests permission to log into the system, the MSS first checks the database to determine if the unique identifier is already logged in. If so, then a hardware or communications failure has occurred and the MSS must make the appropriate adjustments to the database and counter.

33 Claims, 6 Drawing Sheets

U.S. PATENT DOCUMENTS

| | | | |
|---|---|---|---|
| 5,678,006 | A | 10/1997 | Valizadeh et al. |
| 5,715,394 | A | 2/1998 | Jabs |
| 5,717,604 | A | 2/1998 | Wiggins |
| 5,729,546 | A | 3/1998 | Gupta et al. |
| 5,740,176 | A | 4/1998 | Gupta et al. |
| 5,764,756 | A | 6/1998 | Onweller |
| 5,787,253 | A | 7/1998 | McCreery et al. |
| 5,787,427 | A | 7/1998 | Benantar et al. |
| 5,799,017 | A | 8/1998 | Gupta et al. |
| 5,812,529 | A | 9/1998 | Czarnik et al. |
| 5,838,682 | A | 11/1998 | Dekelbaum et al. |
| 5,838,683 | A | 11/1998 | Corley et al. |
| 5,862,480 | A | 1/1999 | Wild et al. |
| 5,867,495 | A | 2/1999 | Elliott et al. |
| 5,889,774 | A | 3/1999 | Mirashrafi et al. |
| 5,922,051 | A | 7/1999 | Sidey |
| 5,987,232 | A | 11/1999 | Tabuki et al. |
| 5,991,810 | A | 11/1999 | Shapiro et al. |
| 5,991,828 | A | 11/1999 | Horie et al. |
| 6,006,258 | A | 12/1999 | Kalajan |
| 6,009,103 | A | 12/1999 | Woundy |
| 6,011,910 | A | 1/2000 | Chau et al. |
| 6,018,619 | A | 1/2000 | Allard et al. |
| 6,023,724 | A | 2/2000 | Bhatia et al. |
| 6,026,087 | A | 2/2000 | Mirashrafi et al. |
| 6,026,440 | A * | 2/2000 | Shrader et al. ............... 709/224 |
| 6,026,441 | A | 2/2000 | Ronen |
| 6,047,376 | A | 4/2000 | Hosoe |
| 6,049,820 | A | 4/2000 | Murphy et al. |
| 6,061,740 | A | 5/2000 | Ferguson et al. |
| 6,088,728 | A * | 7/2000 | Bellemore et al. ............ 709/227 |
| 6,091,951 | A | 7/2000 | Sturniolo et al. |
| 6,108,306 | A | 8/2000 | Kalkunte et al. |
| 6,119,160 | A | 9/2000 | Zhang et al. |
| 6,128,601 | A | 10/2000 | Van Horne et al. |
| 6,144,959 | A | 11/2000 | Anderson et al. |
| 6,151,688 | A | 11/2000 | Wipfel et al. |
| 6,178,505 | B1 | 1/2001 | Schneider et al. |
| 6,185,288 | B1 | 2/2001 | Wong |
| 6,192,405 | B1 | 2/2001 | Bunnell |
| 6,233,604 | B1 | 5/2001 | Van Horne et al. |
| 6,243,716 | B1 | 6/2001 | Waldo et al. |
| 6,252,878 | B1 | 6/2001 | Locklear et al. |
| 6,253,236 | B1 | 6/2001 | Troxel et al. |
| 6,259,705 | B1 | 7/2001 | Takahashi et al. |
| 6,262,984 | B1 | 7/2001 | Rochberger |
| 6,279,054 | B1 | 8/2001 | Boyle |
| 6,292,657 | B1 | 9/2001 | Laursen et al. |
| 6,295,527 | B1 | 9/2001 | McCormack et al. |
| 6,295,536 | B1 | 9/2001 | Sanne |
| 6,314,408 | B1 | 11/2001 | Salas et al. |
| 6,324,264 | B1 | 11/2001 | Wiener et al. |
| 6,360,262 | B1 * | 3/2002 | Guenthner et al. ............ 709/226 |
| 6,360,263 | B1 | 3/2002 | Kurtzberg et al. |
| 6,363,065 | B1 | 3/2002 | Thornton et al. |
| 6,370,151 | B1 | 4/2002 | Bojanic |
| 6,377,982 | B1 | 4/2002 | Rai et al. |
| 6,408,336 | B1 | 6/2002 | Schneider et al. |
| 6,412,000 | B1 * | 6/2002 | Riddle et al. ............... 709/224 |
| 6,412,007 | B1 | 6/2002 | Bui et al. |
| 6,442,608 | B1 | 8/2002 | Knight et al. |
| 6,457,051 | B1 * | 9/2002 | Riddle et al. ............... 709/224 |
| 6,490,344 | B1 | 12/2002 | Murai et al. |
| 6,513,060 | B1 | 1/2003 | Nixon et al. |
| 6,529,955 | B1 * | 3/2003 | Sitaraman et al. ............ 709/225 |
| 6,556,659 | B1 | 4/2003 | Bowman-Amuah |
| 6,584,093 | B1 | 6/2003 | Salama et al. |
| 6,584,529 | B1 | 6/2003 | Thomas |
| 6,615,264 | B1 | 9/2003 | Stoltz et al. |
| 6,625,645 | B1 | 9/2003 | Van Horne et al. |
| 6,625,651 | B1 | 9/2003 | Swartz et al. |
| 6,628,671 | B1 | 9/2003 | Dynarski et al. |
| 6,654,366 | B1 | 11/2003 | Ketcham |
| 6,714,515 | B1 | 3/2004 | Marchand |
| 6,765,903 | B1 | 7/2004 | Allen, Jr. et al. |
| 6,795,888 | B1 | 9/2004 | Apacible et al. |
| 6,798,771 | B1 | 9/2004 | Low et al. |
| 6,856,676 | B1 | 2/2005 | Pirot et al. |
| 6,857,019 | B1 | 2/2005 | Sitaraman et al. |
| 6,862,626 | B1 | 3/2005 | Ryu |
| 6,877,036 | B1 | 4/2005 | Smith et al. |
| 6,879,593 | B1 | 4/2005 | Kunze et al. |
| 6,883,033 | B2 | 4/2005 | Maruyama et al. |
| 6,909,711 | B1 | 6/2005 | Noguchi |
| 6,961,857 | B1 | 11/2005 | Floryanzia |
| 6,980,515 | B1 | 12/2005 | Schunk et al. |
| 7,075,922 | B2 | 7/2006 | Mussman et al. |
| 7,111,321 | B1 | 9/2006 | Watts et al. |
| 7,272,649 | B1 * | 9/2007 | Shively et al. ............... 709/225 |
| 2001/0047333 | A1 | 11/2001 | Kim et al. |
| 2002/0002607 | A1 * | 1/2002 | Ludovici et al. ............ 709/223 |
| 2002/0055998 | A1 * | 5/2002 | Riddle et al. ............... 709/224 |
| 2002/0065878 | A1 * | 5/2002 | Paxhia et al. ............... 709/203 |
| 2002/0075844 | A1 | 6/2002 | Hagen |
| 2002/0078119 | A1 | 6/2002 | Brenner et al. |
| 2002/0085569 | A1 | 7/2002 | Inoue |
| 2002/0089985 | A1 | 7/2002 | Wahl et al. |
| 2002/0102999 | A1 | 8/2002 | Maggenti et al. |
| 2002/0103895 | A1 | 8/2002 | Chiang |
| 2002/0107952 | A1 | 8/2002 | Mancusi et al. |
| 2002/0122417 | A1 | 9/2002 | Miller et al. |
| 2002/0160811 | A1 | 10/2002 | Jannette et al. |
| 2003/0002476 | A1 | 1/2003 | Chung et al. |
| 2003/0051195 | A1 | 3/2003 | Bosa et al. |
| 2003/0065741 | A1 | 4/2003 | Vo |
| 2003/0074576 | A1 | 4/2003 | Kelly |
| 2004/0030752 | A1 | 2/2004 | Selgas et al. |

FOREIGN PATENT DOCUMENTS

| | | |
|---|---|---|
| WO | 97/13382 | 4/1997 |
| WO | 99/53408 | 10/1999 |

OTHER PUBLICATIONS

Carrel, D. et al., The TACACS+ Protocol, Version 1.78, Cisco Systems, Inc., printed from ftp://ftp-eng.cisco.com/gdweber/tac-rfc.1.78.txt on Oct. 23, 2000.

Cisco Systems, Inc., "Cisco DNS/DHCP Manager", printed from http://mwrns.noaa.gov/cisco/cc/td/doc/resprdct/res31.htm, on Sep. 10, 1998, 4 pages.

Cisco Systems, Inc., "CiscoDNS/DHCP Manager V.1.1.", printed from http://www.combinet.com/warp/public/751/dnsmg/dnsmg_ds.htm, on Sep. 10, 1998,4 pages.

Cisco Systems, Inc., "Cisco DNS/DHCP Manager V.1.1", printed from http://www.combinet.com/warp/public/751/dnsmg/dnsmg_pa.htm, on Sep. 10, 1998, 7 pages.

Hot Products & Solutions—IP Address Management: A White Paper, Network Registrar, American Internet Corporation, Bedfor MA, printed from http://www.american.com/ip-mgmt.html, on Jul. 24, 1998.

"IBM Introduces New Subscriber Management System for Internet Service Providers", Dec. 2, 1998, IBM Corporation, printed from http://www.ibm.com/News/1997/12/Is9712102.html.

Khalil et al., "Implementation of a Bandwidth Broker for Dynamic End-to End Resource Reservation in Outsourced Virtual Private Network", The 25th Annual IEEE Conference on Local Computer Networks (LCN), pp. 511-519, Nov. 9-10, 2000.

Rigney, et al., "Remote Authentication Dial In User Service (RADIUS)", Network Working Group, RFC 2138, Apr. 1997, pp. 1-57.

I. Khalil and T. Braun, "Implementation of a Bandwidth Broker for Dynamic End-to-End Resource Reservation in Outsourced Virtual Private Networks," Local Computer Networks, 2000, ISSN 0742-1303, Print ISBN 0-7695-0912-6, 9 pages.

* cited by examiner

AUTOMATIC HARDWARE FAILURE DETECTION AND RECOVERY FOR DISTRIBUTED MAX SESSIONS SERVER

CROSS REFERENCE TO RELATED APPLICATIONS or PRIORITY CLAIM

This application is a divisional of and commonly assigned U.S. patent application Ser. No. 09/410,511 filed on Sep. 30, 1999 now U.S. Pat. No. 7,272,649, in the name of inventors Darrell Myers Shively, II, John Knight, Kavita Shekhar Patil, Pauline Chen Boyd, Sonny Bui and Thomas Anthony Roden, and entitled "Automatic Hardware Failure Detection And Recovery For Distributed Max Sessions Server".

BACKGROUND OF THE INVENTION

1. Field of the Invention

The present invention relates to the field of data communications networks. More particularly, this invention relates to a method and apparatus for automatically detecting hardware and communication failures and accordingly adjusting the true count of users logged into a Max Session Server (MSS). The invention also has applicability to other forms of resource management within a data communications network.

2. The Background

A user, or subscriber, of a network system can remotely log into a data communications network and access resources, such as the Internet, provided by the server. Both businesses and individuals can be users or subscribers. The network systems are typically operated by Internet Service Providers (ISPs), telephone companies, or Online Service Providers (collectively referred to as ISPs). There are numerous transmission media available to connect to the ISPs, including dialing in over the telephone network (PSTN) or connecting in another conventional manner such as via DSL (digital subscriber line), cable, ISDN (integrated services digital network), etc. Via whichever selected form of transmission, users typically gain remote access through a network access server (NAS). The NAS then requires some type of unique identification to allow access, such as a user name and password.

FIG. 1 is a diagram depicting a typical relationship between users and the server. The users (clients or subscribers) can log into a number of network access servers ($NAS_1$, $NAS_2$ and $NAS_3$), which provide data communications portals to a point of presence (PoP) on the data communications network. Each NAS is in communication with a conventional AAA (authentication, authorization and accounting) or similar service to determine if the log in is authorized. If authorized, the user then gains access to the network service.

Most ISPs provide large numbers of NASs to allow numerous users at various geographic regions to gain access to the system. However, it often becomes necessary to keep track of the total number of users or groups of users logged into the multiple NASs. For example, a company may purchase access for fifty of its employees at any given time from an ISP. Thus, the ISP needs to keep track of how many users from the particular company are logged into the system. Similarly, a single user may only pay for access to the system from one connection at any given time. However, a home user with multiple computers could attempt to log in from several computers. It is in the interest of the ISP to limit that user to only the one session that the user has purchased.

In order to keep track of the number of log ins, ISPs or Online Services may utilize a Max Sessions Server (MSS), which can either be a separate entity or integrated with an Authorization, Authentication and Accounting server (AAA) and is commercially available from vendors such as Cisco Systems, Inc. of San Jose, Calif. The MSS restricts a user or a group of users (collectively referred to as a group) to a maximum number of sessions across a complete administrative domain. It does this by maintaining a counter for each user or group of users. A single user may belong to multiple groups, where each group has its own session counter. For each logged in user added, the corresponding counter(s) is incremented by one. In the event that a user belongs to multiple groups, the counter for each associated group will be incremented. For example, a company may allocate 200 logins for the engineering group, which may be further subdivided into 50 logins for hardware engineering group, 50 logins for the systems engineering group, and 100 logins for the design engineering group. When a user belonging to the systems engineering group logs in, the counter for both the systems engineering group and the overall engineering group will be incremented by one. When the user logs out of the NAS, the NAS sends an accounting record to the AAA server with a conventional protocol such as RADIUS or TACACS+ indicating that the session has stopped. The AAA server notifies the MSS that the user at a particular NAS and port has logged off and the associated counter(s) for that user are decremented by one.

FIG. 2 is a flow diagram of the communication between client and server. The user connects to a NAS, which then sends a request for authorization to the AAA. The AAA sends a request to a Max Sessions Server (MSS) to determine if there are available slots left for the user to log into the system. If the connection is within the allotted number of log ins for that user or group of users, then the request is granted and the corresponding counter is incremented by one. However, if the connection would result in more log ins than are allotted to the user or group, then the request is denied.

It is important to note that each MSS maintains a counter for a particularly designated user or group of users and only that MSS will maintain the count for that designated user or group of users. For example, a company may have a systems division that has 200 logins allotted and a hardware division that has 200 logins allotted. One MSS may maintain the counter for both of these groups or there may be two MSSs, where one handles the systems division and one handles the hardware division.

Consider what happens when a user ($USER_{A10}$) belonging to a group at site A of a company travels to site B of the company. Referring to FIG. 3, each site at the company has an MSS, which maintains its list of authorized number of users per group at each respective site. When $USER_{A10}$ attempts to log into the server at site B, through the log in process the $MSS_B$ identifies the user's group and then recognizes that it does not maintain the counter for the users group. Instead, it will proxy the request to $MSS_A$. Assuming the user is authorized to log in, the user will be located at a port on the NAS at site B, but accounted for at the MSS at site A. In other words, $MSS_A$ will add the connection to $USER_{A10}$ to its count for users belonging to group A.

When a hardware or communication failure occurs, a user or group of users may actually be logged out through disconnection (abnormally disconnected) and yet the MSS will not be notified. Therefore, the count of the number of sessions maintained by MSS for the user or group will be more than the actually existing number of sessions. The MSS may deny users access based on the inaccurate count, when the users should be granted access. This will result in the user or group receiving fewer connections than entitled, which is a condition known as "under-subscription." ISPs do not want to create customer dissatisfaction; therefore, this result is highly undesirable.

What is needed is an addition to the present MSS that can automatically detect hardware and communications failures and adjust the session count accordingly. This would overcome the under-subscription problem by allowing the correct number of users authorized on the system to log in.

SUMMARY OF THE INVENTION

A failure detection system operates in conjunction with a Max Sessions Server. A first type of failure detection operates at the user level and is implemented every time a new user attempts to log into the system. Upon log in, the user is assigned to a particular NAS and port. The NAS sends a request to an AAA for authorization, which in turn queries the MSS to determine if the log in will violate the allotment for that particular user or group of users. The MSS will only allow a predetermined number of connections at a time for each user or group of users. A master list of unique identification values (UIVs) for all logged in users is maintained at the MSS. The UIV may be a concatenation of the NAS identification and port identification and should be unique to it. Since only one connection can be made on a given NAS at a given port, this number is unique at any given time. For each new AAA request, the MSS compares UIV of the new request with the UIVs already in use in the MSS master list. If the UIV is duplicated, then the system can correctly conclude that a hardware or communications failure occurred and the original user at that NAS/port has been disconnected. In this case, the system will decrement the appropriate MSS counter(s) by one and remove the UIV from the master list. The login request will then proceed as normal in an MSS request, where the AAA request will only be granted if there is space available in the allocated number of slots for the user or group of users.

A second type of failure detection operates at the NAS level. When a particular NAS has failed to communicate with the MSS for a given length of time, the system concludes that there is a communications or hardware failure on that NAS. All of the UIVs associated with that particular NAS are removed from the master fist and the corresponding counter for the MSS is decreased by the total number of users that were previously logged into the failed NAS. Furthermore, since multiple MSS systems may be associated with a given NAS, a message is broadcast to all previously interested MSSs to remove the associated UIVs and decrement their counters. This broadcast is performed by sending data packets to the interested remote MSSs over the net encapsulated in TCP (Transmission Control Protocol).

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION OF THE PREFERRED EMBODIMENTS

Those of ordinary skill in the art will realize that the following description of the present invention is illustrative only and not in any way limiting. Other embodiments of the invention will readily suggest themselves to such skilled persons having the benefit of this disclosure.

In accordance with a presently preferred embodiment of the present invention, the components, processes and/or data structures may be implemented using C++ programs running on high performance computers (such as an Enterprise 2000™ server running Sun Solaris™ as its operating system). The Enterprise 2000™ server and Sun Solaris™ operating system are products available from Sun Microsystems, Inc. of Mountain View, Calif. Different implementations may be used and may include other types of operating systems, computing platforms, computer programs, firmware and/or general purpose machines. In addition, those of ordinary skill in the art will readily recognize that devices of a less general purpose nature, such as hardwired devices, devices relying on FPGA (field programmable gate array) or ASIC (Application Specific Integrated Circuit) technology, or the like, may also be used without departing from the scope and spirit of the inventive concepts disclosed herein.

This invention teaches two levels of automatic failure detection and correction. The first level of detection operates to detect user-level failures. The second level of detection operates to detect NAS-level failures. In order to implement both levels of detection, the MSS must maintain a master list of UIVs for each user log in. To create the UIV, the MSS creates a concatenation of a unique NAS identifier (either its IP address or "name") and the port identifier of the port of the NAS through which the user is connected. Since only one user can be logged into a particular port on a particular NAS, this number is unique to the connection. Furthermore, all UIVs associated with a given NAS are readily identifiable.

As an example, assume the NAS IP address is 10.1.1.10 and the NAS name is MYNAS and assume the user logs into the NAS at port TTY2. Either the NAS IP address or name can be used in the concatenation. Thus, the UIV could be either 10.1.1.10#TTY2 or MYNAS#TTY2 or another suitable UIV formed in this general way. However, one protocol would be selected and followed consistently. In other words, the MSS would not sometimes use the NAS IP address and sometimes use the NAS name. Similarly, the order of the concatenation does not matter (either NAS first or Port first); however, whichever convention is selected would always be used for consistency.

Figure 4:
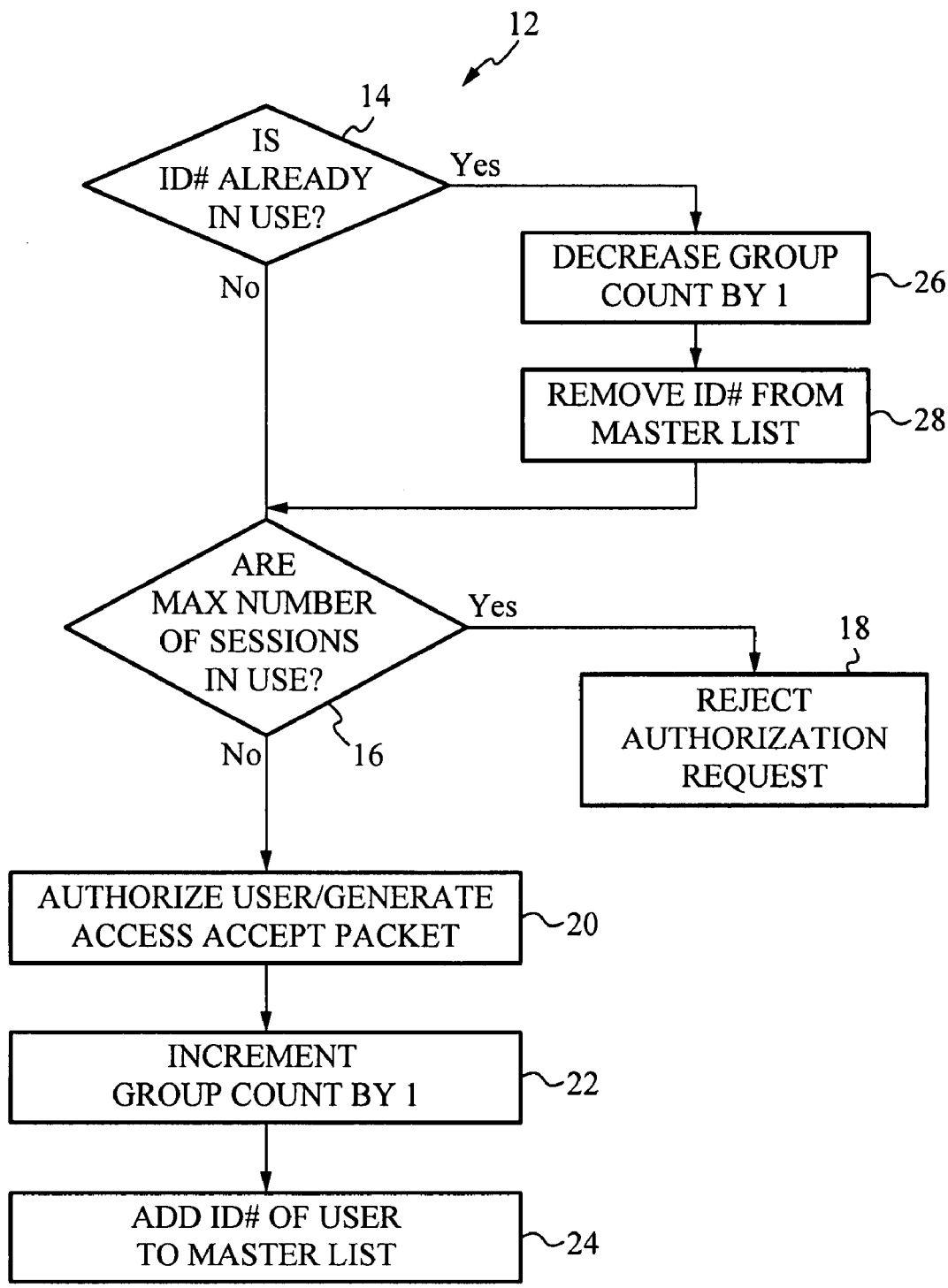
FIG. 4 is a flow diagram illustrating the operation of the failure detection system for a user level failure in accordance with a presently preferred embodiment of the present invention.

Referring to FIG. 4, the user-level failure detection 12 is diagramed. When the user logs into the NAS at a particular port, the NAS then sends an access request packet to the AAA (or an equivalent authorization server) for authorization. The AAA must then request permission from the MSS to allow an additional user to log into the system. Assuming that the MSS maintains the counter for the user or user's group, the MSS will follow multiple steps. (Note that in the event that it does not, the request will be proxied to the appropriate MSS and that MSS will follow the steps below.) First, it will generate a UIV based on the particular port and NAS to which the connection is logged in. Then, the MSS will compare (block 14) this the UIV of the requesting user to the master list of UIVs that are already logged into the system. If the UIV is not on the master list, then there has been no user level failure. At this point, the MSS proceeds to verify if the maximum number of log ins for the user or user's group would be violated if the AAA request is granted (block 16). If the maximum would be exceeded, the request is denied with an access-reject packet (block 18). If the maximum would not be exceeded, then the request is granted with an access-accept packet (block 20). Once authorized, the MSS then increments the corresponding counters by one (block 22) and adds the UIV to its master list (block 24).

If however, when the MSS compares the UIV of the current log in request to the master list, the number is found on the list, then the MSS concludes that a communication or hardware failure occurred. Since it is impossible for two different users to log in with the same UIV (based on NAS and port number), then the older connection must have been lost due to a hardware or communications failure allowing a second user to connect to the NAS and port number of the prior user's connection. In this case, the MSS takes several steps. The MSS removes the UIV from the master list (block 28) and decrements the corresponding counters by one (block 26). At this point, the over-estimation has been corrected and the system will proceed with the authorization request. Then, the MSS will consult the corresponding counter to see if the maximum number of users would be exceeded if the AAA request is granted. If so, then the request is denied; if not, then the user is authorized. Once authorized, the MSS will add the newly logged in UIV to the master list and increment the corresponding counter(s) by one. Thus, no connection has been denied based on an inaccurate log in count from user level failures. Note that NAS-AAA-MSS communications may be carried out in any suitable fashion, such as by use of the well-known RADIUS or TACACS+ protocols.

Figure 5:
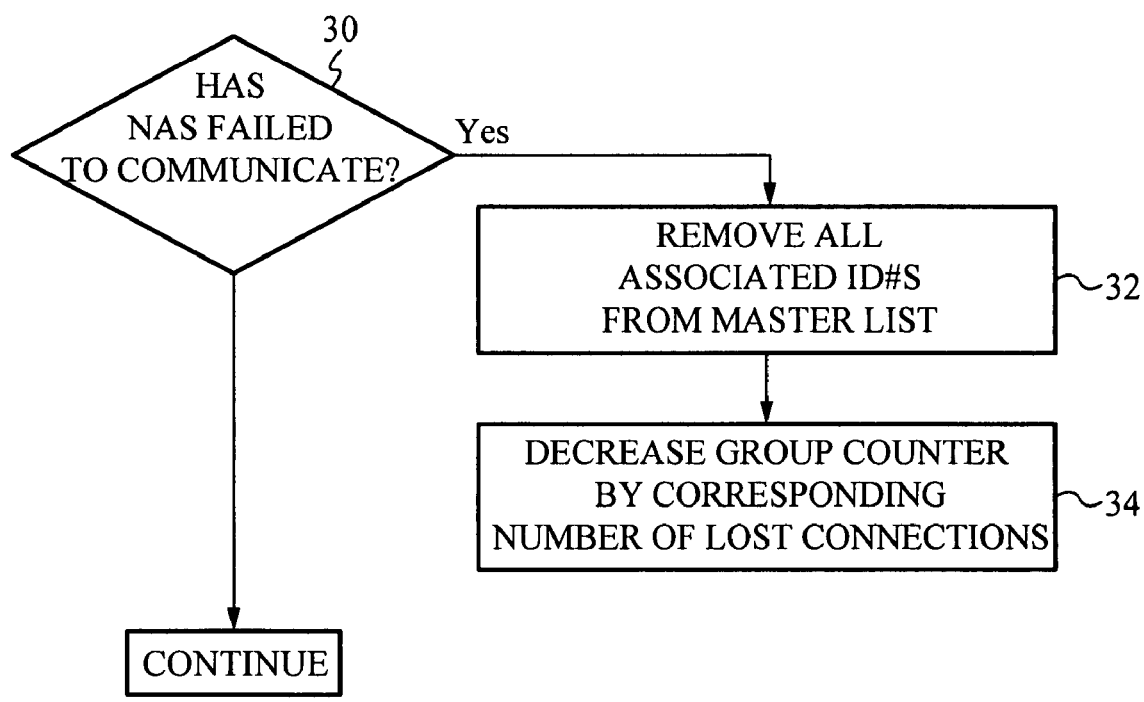
FIG. 5 is a flow diagram illustrating the operation of the failure detection system for a NAS level failure in accordance with a presently preferred embodiment of the present invention.

The second level of failure detection is a NAS-level failure and is diagrammed at FIG. 5. If the NAS goes down or fails to communicate with the MSS (block 30) within a predetermined amount of time, the MSS concludes that the NAS has had a hardware or communications failure and has become entirely inoperative. In this type of communications or hardware failure, potentially numerous connections from users have been terminated but are still recorded as being logged in. The MSS count is over-estimated and must be corrected.

According to the present invention, the MSS will automatically correct for the lost connections from a NAS-level failure. Referring to FIG. 5, if the NAS has failed to communicate, then all UIVs associated with the NAS will be removed from the master list (block 32). As described above, the UIVs are a concatenation of the NAS and port identifiers; therefore, the MSS will be able to easily determine which UIVs are associated with the failed NAS. The MSS will adjust the corresponding counters by the number of lost sessions 34.

Figure 1:
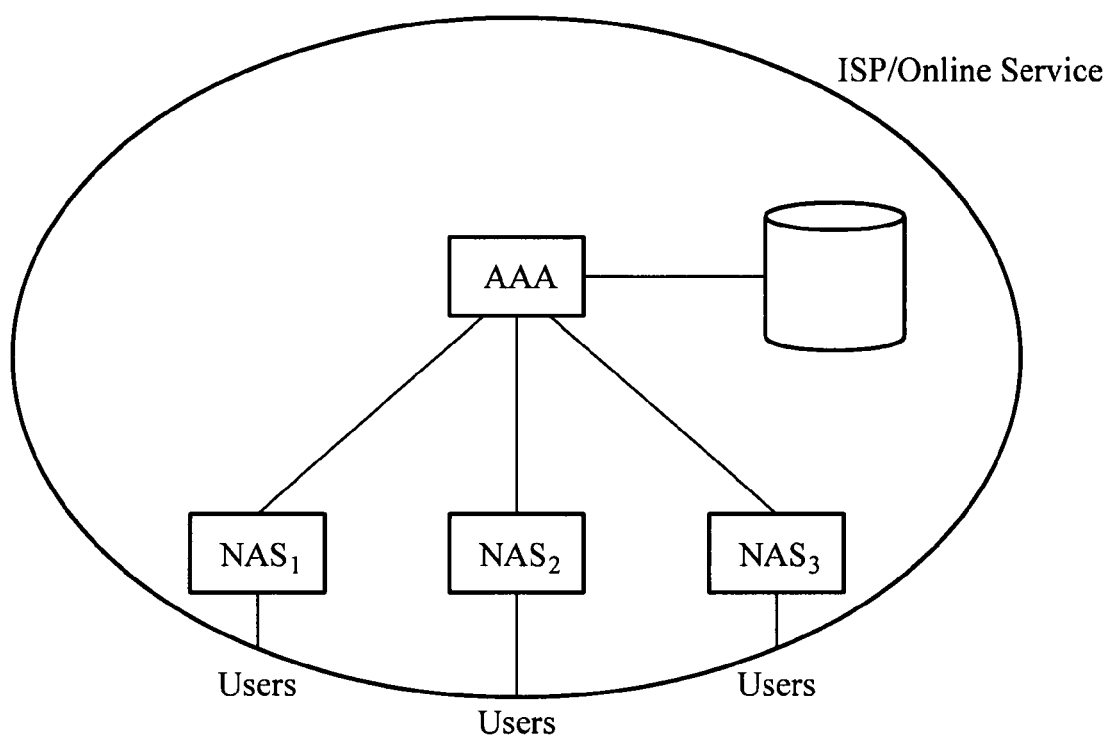
FIG. 1 is a block diagram showing a simple client/server relationship system in accordance with the prior art.
Figure 2:
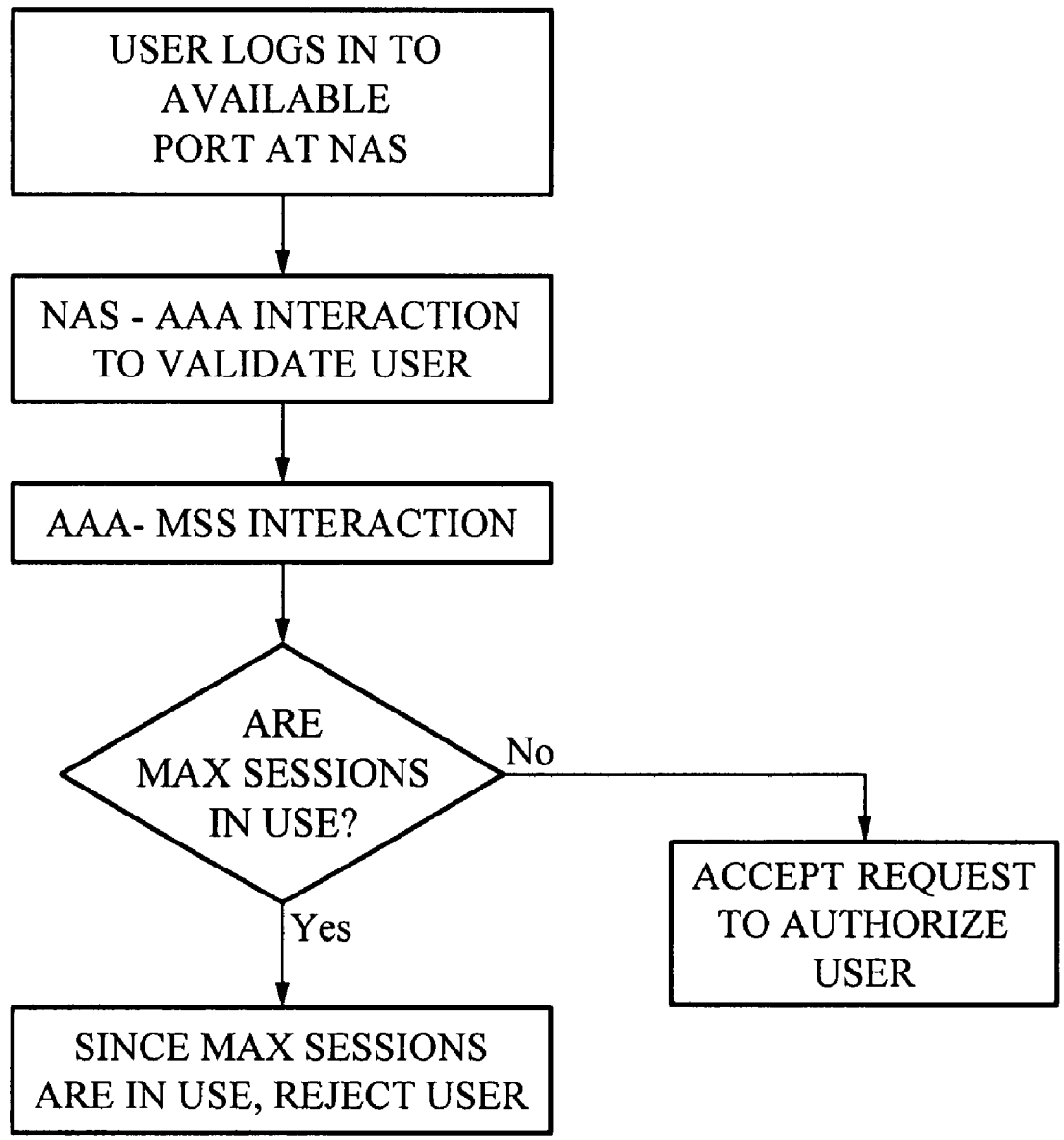
FIG. 2 is a flow diagram of the operation of a Max Sessions Server (MSS) in accordance with the prior art.
Figure 3:
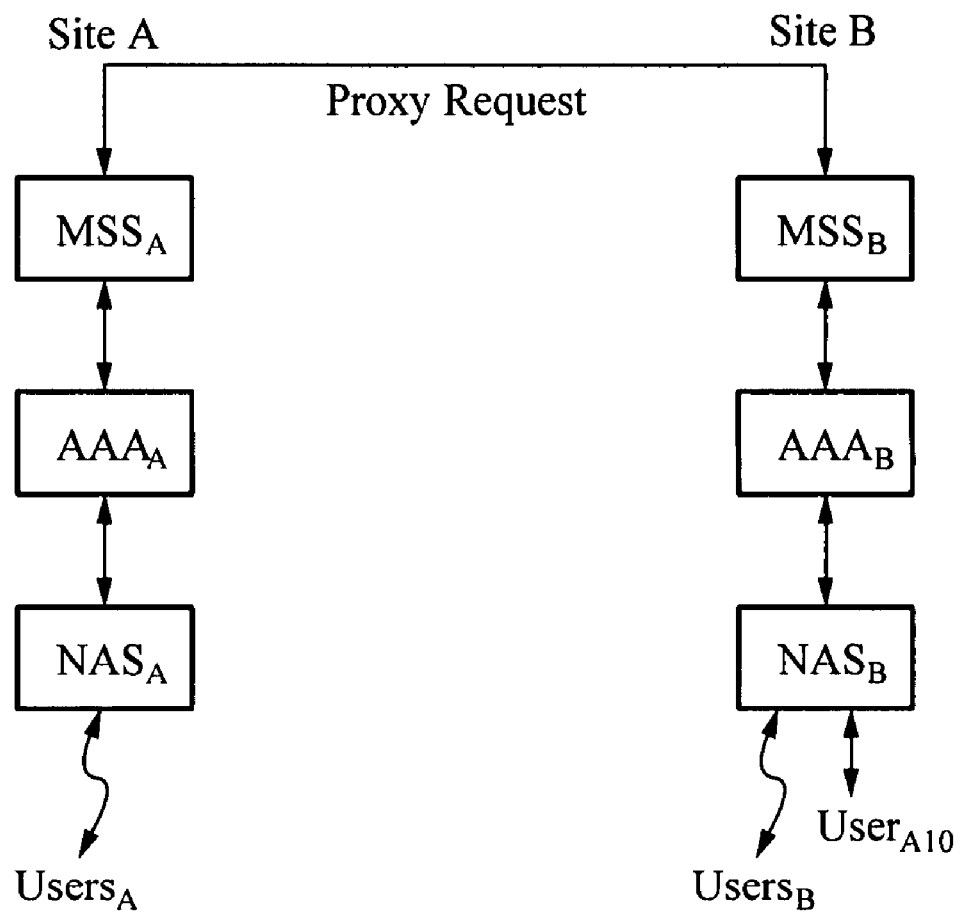
FIG. 3 is a block diagram showing a proxy request between two MSS at different sites in accordance with the prior art.

Additionally, there can be multiple MSSs associated with users on the failed NAS. Recall the scenario of FIG. 3, where a user belonging to a group at site A of a company travels to site B of a company. When the user attempts to log into the server at site B, the $MSS_B$ will proxy the request to $MSS_A$. Assuming that the user is authorized to log in, the user will be located at a port on the NAS at site B, but accounted for at the MSS at site A. If the $NAS_B$, crashes, then the $MSS_B$ will detect the failure, and it will adjust accordingly for all lost connections for which it maintains the counters and master identification lists. However, the MSS at site A will not know about the failure at the NAS at site B and will be under-subscribed since it still has a user counted for that is no longer connected. Therefore, in this situation, it is preferred that the MSS, broadcast a message to $MSS_A$ to notify it of the failure. In order to notify $MSS_A$ a suitable data packet is sent over the data communications network encapsulated in a suitable protocol such as TCP (transmission control protocol).

When a NAS failure is detected, the MSS will identify any remote MSS that has previously shown an interest in a connection on the failed NAS and will broadcast the information. Thus, all counts and master lists on other MSSs will also accurately reflect the result of a failed NAS.

In an extension of the present invention, a more generic Resource Control Server (RCS) could operate in the same basic way as the MSS described above to control the allocation of resources other than sessions. Such resource could include any type of limited resource within the data communications network, such as, for example, call gateways, VPNs (virtual private networks), B-channels (used with ISDN connections), and the like. Members of groups would subscribe for minimum service levels of the resource and when the minimum service level is provided, no further service need be provided. The same problem of under-subscription still exists and can be corrected with the present invention.

Figure 6:
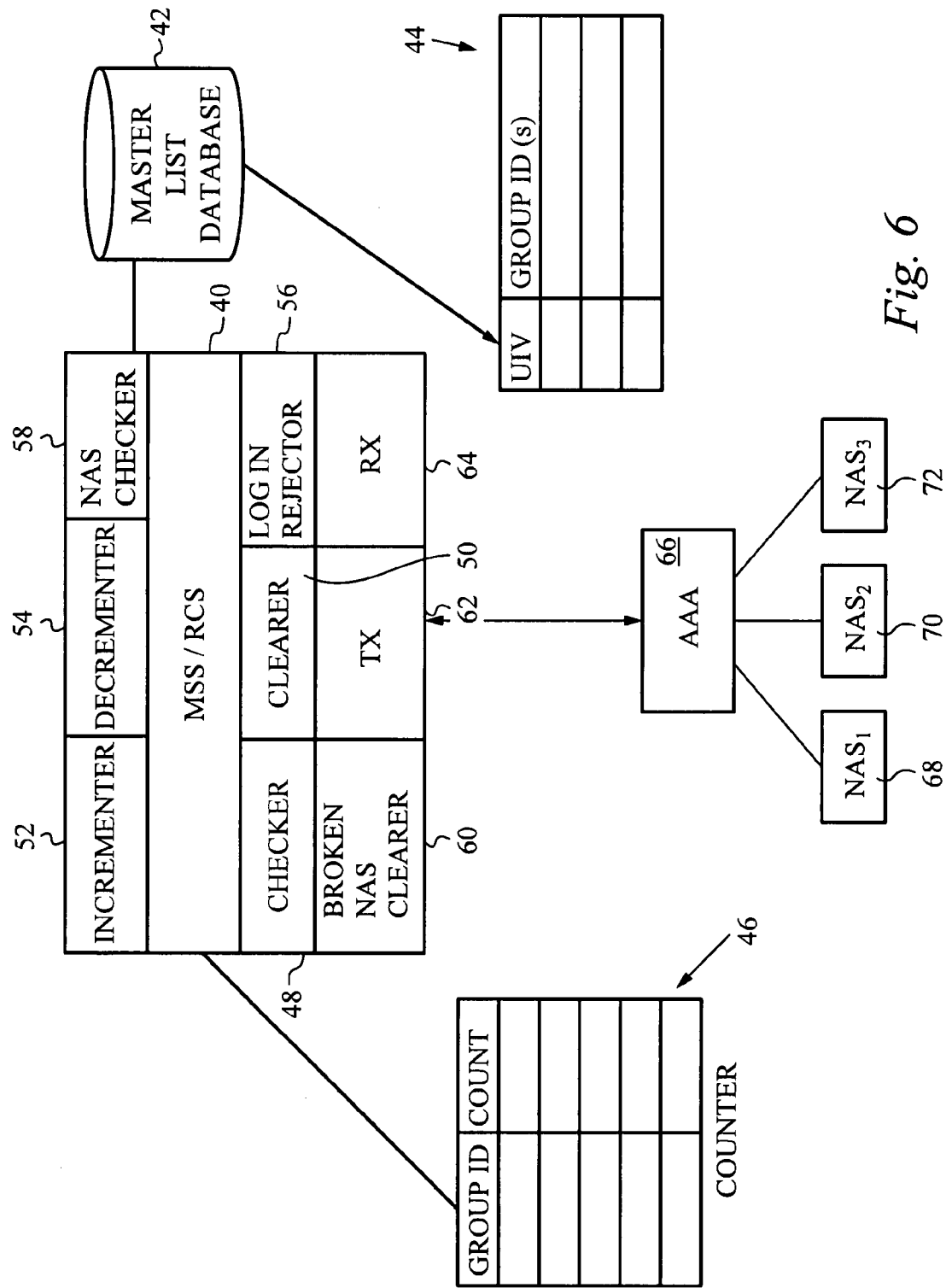
FIG. 6 is a system block diagram showing a system in accordance with a presently preferred embodiment of the present invention.

FIG. 6 shows a system block diagram of a system in accordance with a presently preferred embodiment of the present invention.

A MSS or RCS 40 includes a database 42 storing the master list 44 which stores UIVs and associated group identifications. The MSS/RCS 40 also stores and maintains counters for each group ID 46. A checker 48 compares each new log in request directed to MSS 40 with the contents of master list 44 to determine if the UIV of the new log in request matches an existing UIV in the master list 44 of database 42. A clearer 50 clears existing information in master list 44 associated with a UIV if the UIV is determined by the checker 48 to be the same as that of the new log in request. An incrementer 52 increments a counter 46 for each new log in by a member of a corresponding group of users. For the RCS version, this occurs when a user initiates use of the controlled resource. A decrementer 54 decrements a counter 46 when the user logs out or gives up the resource. A log in rejector 56 rejects a user's attempt to log in (MSS version) or gain access to a resource (RCS version) if doing so would cause the corresponding counter to exceed its authorized maximum. A NAS checker 58 periodically checks one or more associated NASs to determine if it/they have become non-operational. Note that this function may be implemented in the MSS/RCS or in another portion of the data communication network such as a AAA server or a network operations center (NOC) with the results of the check or a failure notification sent to the MSS/RCS. A broken NAS clearer 60 responsive clears existing data in the master list associated with a broken or non-operational NAS. A transmitter 62 transmits a communication to another MSS on the data communications network to inform it of the non-operational status of a NAS. A receiver 64 receives communications from a transmitter of another MSS or another source informing of the non-operational status of a NAS. Such information may be passed to broken NAS clearer 60 for action.

An AAA 66 couples the NASs 68, 70, 72 with the MSS 40 via a suitable protocol such as RADIUS or TACACS+.

Alternative Embodiments

While embodiments and applications of the invention have been shown and described, it would be apparent to those of ordinary skill in the art having the benefit of this disclosure that many more modifications than mentioned above are possible without departing from the inventive concepts herein. A more generic Resource Control Server (RCS) could operate in the same basic way as the MSS described above to control the allocation of resources other than sessions. Such resource could include any type of limited resource within the data communications network, such as, for example, call gateways, VPNs (virtual private networks), B-channels (used with ISDN connections), and the like. Members of groups would subscribe for minimum service levels of the resource and when the minimum service level is provided, no further service need be provided. The same problem of under-subscription still exists and can be corrected with the present invention. The invention, therefore, is not to be restricted except in the spirit of the appended claims.

What is claimed is:

1. A method for a Max Sessions Server (MSS) of a data communications network to keep a count of the sessions used at a given time by a group of users and to correct the count to compensate for abnormal disconnections of users belonging to the group, the method comprising: assigning a unique identification value (UIV) to each port of a network access server (NAS) of the data communications network; maintaining a master list having a plurality of entries, each entry containing at least (a) a UIV for a port associated with a logged in user and (b) respective group identification information for the logged in user; and responding to a new user's attempt to log in to the data communications network by checking to see if the UIV for the port associated with the new user is already included in an existing entry in the master list, and if the UIV is included, indicating an abnormal disconnection of a previously logged in user, then clearing the existing entry from the master list and adding a new entry to the master list, the new entry containing at least (a) the UIV for the port associated with the new user and (b) respective group identification information for the new user.

2. The method of claim 1, wherein the responding further comprises: decrementing a counter associated with the group identification information associated with the UIV of the cleared existing entry; and incrementing a counter associated with the group identification information associated with the UIV of the added new entry of the new user.

3. The method of claim 2, further comprising: rejecting the new user's attempt to log in to the data communications network if the log in would cause a counter associated with a group to which the new user belongs to exceed a predetermined number of maximum sessions.

4. The method of claim 3, wherein the assigning further comprises: forming the UIV from a port identification associated with the port and from a NAS identification associated with the NAS.

5. The method of claim 2, further comprising: allowing the new user's attempt to log into the data communications network if the log in would not cause a counter associated with a group to which the new user belongs to exceed a predetermined number of maximum sessions.

6. The method of claim 5, wherein the assigning further comprises: forming the UIV from a port identification associated with the port and from a NAS identification associated with the NAS.

7. The method of claim 2, wherein the assigning further comprises: forming the UIV from a port identification associated with the port and from a NAS identification associated with the NAS.

8. The method of claim 1, further comprising: rejecting the new user's attempt to log in to the data communications network if the log in would cause a counter associated with a group to which the new user belongs to exceed a predetermined number of maximum sessions.

9. The method of claim 3, wherein the assigning further comprises: forming the UIV from a port identification associated with the port and from a NAS identification associated with the NAS.

10. The method of claim 1, further comprising: allowing the new user's attempt to log into the data communications network if the log in would not cause a counter associated with a group to which the new user belongs to exceed a predetermined number of maximum sessions.

11. The method of claim 10, wherein the assigning further comprises: forming the UIV from a port identification associated with the port and from a NAS identification associated with the NAS.

12. The method of claim 1, wherein the assigning further comprises: forming the UIV from a port identification associated with the port and from a NAS identification associated with the NAS.

13. A method for a Resource Control Server (RCS) of a data communications network to keep a count of a particular resource used at a given time by a group of users and to correct the count to compensate for abnormal disconnections of users belonging to the group, the method comprising: assigning a unique identification value (UIV) to each port of a network access server (NAS) of the data communications network; maintaining a master list having a plurality of entries, each entry containing at least (a) a UIV for a port associated with a logged in user and (b) respective group identification information for the logged in user; and responding to a new user's attempt to log in to the data communications network by checking to see if the UIV for the port associated with the new user is already included in an existing entry in the master list, and if the UIV is included, indicating an abnormal disconnection of a previously logged in user, then clearing the existing entry from the master list and adding a new entry to the master list, the new entry containing at least (a) the UIV for the port associated with the new user and (b) respective group identification information for the new user.

14. The method of claim 13, wherein the responding further comprises: decrementing a counter associated with the group identification information associated with the UIV of the cleared existing entry; and incrementing a counter associated with the group identification information associated with the UIV of the added new entry of the new user.

15. The method of claim 14, wherein the assigning further comprises: forming the UIV from a port identification associated with the port and from a NAS identification associated with the NAS.

16. The method of claim 13, wherein the assigning further comprises: forming the UIV from a port identification associated with the port and from a NAS identification associated with the NAS.

17. An apparatus for keeping a count of a particular resource used at a given time by a group of users, the apparatus comprising: a processor; a Resource Control Server (RCS); a database maintained by said RCS including for each user logged into a data communications system through the RCS, the user belonging to a group, a unique identification value (UIV) associated with the user's connection to the data communications network through a particular port of a particular Network Assess Server (NAS) for the data communications network, and group identification information associated with the user; a checker configured to compare each new log in request directed to the RCS with contents of the database to determine if a UIV for a port of the new log in request matches an existing UIV for a port in the database thus indicating an abnormal user disconnection; and a clearer configured to clear existing information in the database associated with the UIV if the checker determines that a UIV in the database is the same as the UIV of a new log in request.

18. The apparatus of claim 17, further comprising: a counter configured to keep a count of resources used by a group of users.

19. The apparatus of the claim 18, further comprising: an incrementer configured to increment the counter for each new use of resources by a member of the group of users.

20. The apparatus of claim 19, further comprising: a decrementer configured to decrement the counter for each disconnection of a member of the group of users using resources.

21. The apparatus of claim 20, further comprising: a NAS checker configured to check a NAS associated with the RCS to determine if it has become non-operational; and a broken NAS clearer configured to clear existing information in the database associated with a NAS if the NAS checker determines the NAS to be non-operational.

22. The apparatus of claim 21, further comprising: a transmitter configured to transmit a communication to another RCS over the data communications network to inform the another RCS of the non-operational status of a NAS.

23. The apparatus of claim 20, further comprising: a receiver configured to receive communications over the data communications network informing of the non-operational status of a NAS.

24. The apparatus of claim 23, further comprising: a broken NAS clearer configured to clear existing information in the database associated with a NAS if the receiver is informed of the non-operational status of the NAS.

25. A Max Sessions Server (MSS) apparatus configured to take into account abnormal user disconnections by keeping a count of the sessions used at a given time by a group of users, the apparatus comprising: a processor; a MSS; a database maintained by the MSS including for each user logged into the data communications system through the MSS, the user belonging to a group, a unique identification value (UIV) associated with the user's connection to the data communications network through a particular port of a particular Network Assess Server (NAS) for the data communications network, and group identification information associated with the user; a checker configured to compare each new log in request directed to the MSS with contents of the database to determine if a UIV for a port of the new log in request matches an existing UIV for a port in the database thus indicating an abnormal user disconnection; and a clearer configured to clear existing information in the database associated with the UIV if the checker determines that a UIV in the database is the same as the UIV of a new log in request.

26. The apparatus of claim 25, further comprising: a counter configured to keep a count of sessions used by a group of users.

27. The apparatus of claim 26, further comprising: an incrementer configured to increment the counter for each new log in by a member of the group of users.

28. The apparatus of claim 27, further comprising: a decrementer configured to decrement the counter for each disconnection of a member of the group of users.

29. The apparatus of claim 28, further comprising: a log in rejecter configured to reject a user belonging to the group of user's if the user's log in would cause the counter to exceed an authorized session count for the group of users.

30. The apparatus of claim 29, further comprising: a NAS checker configured to check a NAS associated with the MSS to determine if it has become non-operational; and a broken NAS clearer configured to clear existing information in the database associated with a NAS if the NAS checker determines the NAS to be non-operational.

31. The apparatus of claim 30, further comprising: a transmitter configured to transmit a communication to another MSS on the data communications network to inform it of the non-operational status of a NAS.

32. The apparatus of claim 29, further comprising: a receiver configured to receive communications over the data communications network informing of the non-operational status of a NAS.

33. The apparatus of claim 32, further comprising: a broken NAS clearer configured to clear existing information in the database associated with a NAS if the receiver is informed of the non-operational status of the NAS.

* * * * *